(12) United States Patent
Nammi et al.

(10) Patent No.: US 11,671,157 B2
(45) Date of Patent: *Jun. 6, 2023

(54) DETERMINING CHANNEL STATE INFORMATION IN 5G OR OTHER NEXT GENERATION WIRELESS COMMUNICATION SYSTEMS WITH MULTIPLE TRANSMISSION POINTS

(71) Applicant: AT&T Intellectual Property I, L.P., Atlanta, GA (US)

(72) Inventors: SaiRamesh Nammi, Kista (SE); Arunabha Ghosh, Austin, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/370,364

(22) Filed: Jul. 8, 2021

(65) Prior Publication Data

US 2021/0336676 A1 Oct. 28, 2021

Related U.S. Application Data

(63) Continuation of application No. 16/543,294, filed on Aug. 16, 2019, now Pat. No. 11,088,745.

(51) Int. Cl.
| | |
|---|---|
| *H04B 7/06* | (2006.01) |
| *H04L 1/00* | (2006.01) |
| *H04L 5/00* | (2006.01) |
| *H04W 72/23* | (2023.01) |
| *H04L 1/1607* | (2023.01) |
| *H04W 76/27* | (2018.01) |

(52) U.S. Cl.
CPC ......... *H04B 7/0626* (2013.01); *H04L 1/0026* (2013.01); *H04L 5/0048* (2013.01); *H04W 72/23* (2023.01); *H04L 1/1614* (2013.01); *H04W 76/27* (2018.02)

(58) Field of Classification Search
None
See application file for complete search history.

(56) References Cited

U.S. PATENT DOCUMENTS

| 9,559,820 B2 | 1/2017 | Geihofer et al. |
|---|---|---|
| 2012/0281567 A1 | 11/2012 | Gao et al. |

(Continued)

OTHER PUBLICATIONS

Non-Final office action received for U.S. Appl. No. 16/543,294 dated Nov. 12, 2020, 20 pages.

(Continued)

*Primary Examiner* — Otis L Thompson, Jr.
(74) *Attorney, Agent, or Firm* — Amin, Turocy & Watson, LLP

(57) ABSTRACT

The described technology is generally directed towards indicating to a receiver (e.g., a user equipment) which antenna ports are assigned for channel state information reference signals (CSI-RS). The indicator can be sent as radio resource control configuration data and/or by physical layer signaling such as in downlink control information. The receiver computes CSI based on the assigned antenna port or ports, and the reported (e.g., joint) CSI helps avoid mismatched joint CSI used for scheduling when multiple transmit and receive points (TRPs) are communicating with the user equipment.

20 Claims, 12 Drawing Sheets

(56) References Cited

U.S. PATENT DOCUMENTS

| | | |
|---|---|---|
| 2013/0114425 A1 | 5/2013 | Sayana et al. |
| 2015/0195071 A1 | 7/2015 | Lunttila et al. |
| 2015/0208263 A1 | 7/2015 | Behravan et al. |
| 2015/0223161 A1 | 8/2015 | Xiao et al. |
| 2016/0301511 A1 | 10/2016 | Yoon et al. |
| 2019/0109686 A1 | 4/2019 | Jiang et al. |
| 2019/0215086 A1* | 7/2019 | Kwak .................. H04L 1/0693 |
| 2019/0320453 A1 | 10/2019 | Hosseini et al. |
| 2020/0106584 A1 | 4/2020 | Jiang et al. |
| 2020/0112420 A1 | 4/2020 | Xu et al. |
| 2020/0119797 A1 | 4/2020 | Wang et al. |
| 2020/0153543 A1 | 5/2020 | Khoshnevisan et al. |
| 2020/0178272 A1 | 6/2020 | Khoshnevisan et al. |
| 2020/0245166 A1* | 7/2020 | Kwak .................... H04B 7/024 |
| 2020/0328792 A1* | 10/2020 | Wei ...................... H04B 7/0626 |
| 2021/0152302 A1* | 5/2021 | Kwak ................. H04W 72/042 |
| 2021/0336676 A1* | 10/2021 | Nammi ................ H04L 5/0057 |

OTHER PUBLICATIONS

Notice of Allowance received for U.S. Appl. No. 16/543,294 dated Apr. 9, 2021, 17 pages.

* cited by examiner

DETERMINING CHANNEL STATE INFORMATION IN 5G OR OTHER NEXT GENERATION WIRELESS COMMUNICATION SYSTEMS WITH MULTIPLE TRANSMISSION POINTS

RELATED APPLICATION

The subject patent application is a continuation of, and claims priority to, U.S. patent application Ser. No. 16/543,294 (now U.S. Pat. No. 11,088,745), filed Aug. 16, 2019, and entitled "DETERMINING CHANNEL STATE INFORMATION IN 5G OR OTHER NEXT GENERATION WIRELESS COMMUNICATION SYSTEMS WITH MULTIPLE TRANSMISSION POINTS," the entirety of which application is hereby incorporated by reference herein.

TECHNICAL FIELD

The subject application is related to wireless communication systems, and more particularly to computing and reporting channel state information (CSI) in wireless communication systems, such as fifth generation (5G) or other next generation wireless networks, with multiple transmission (transmit/receive) points.

BACKGROUND

In wireless communication systems, including New Radio (NR, sometimes referred to as 5G) and likely beyond, a user equipment computes channel estimates based on pilot or reference signals sent from a network device transmit-receive point (TRP), such as a gNode B (gNB). In general, the user equipment computes channel state information (CSI) based on the reference signals and reports the CSI to the TRP, which then computes communication parameters (e.g., modulation and coding scheme, power-related data, physical resource blocks and so on). These computed communication parameters are used for subsequent communications; for example, downlink control information (DCI) is sent via a downlink control channel to the user equipment to schedule the user equipment for receiving downlink transmissions from the TRP.

With multiple transmission points, the same procedure described above is repeated. For example, a second TRP similarly sends reference signals and receives a CSI report based on those reference signals. If the TRPs are co-located with multiple panels, or the connecting link between the TRPs comprises ideal backhaul, then the scheduling can be optimized, e.g., by using a single DCI.

Thus, with multiple transmission points and using a single downlink control channel, the user equipment sends a CSI corresponding to the particular TRP, that is, sends a first CSI based on the references signals received from a first TRP to the first TRP, and sends a second CSI based on the references signals received from the second TRP to the second TRP. However, during the scheduling the UE, the network uses an aggregated CSI to compute the (e.g., downlink) parameters, as the network uses a single physical downlink control channel (PDCCH) to send the DCI. For example, consider that the first CSI with a channel quality indicator (CQI) corresponding to the first TRP is CQI-1, while the CQI corresponding to the second TRP is CQI-2; in this case, the network device (e.g., the first TRP) uses the minimum quality (min(CQI-1, CQI-2)) or mean quality (mean(CQI-1, CQI-2)) as a joint CSI for scheduling. However the joint CSI can be significantly different depending on whether the quality information corresponds to min(CQI-1, CQI-2) or mean(CQI-1, CQI-2). Because of this mismatch between the estimated CSI and the scheduled CSI, loss in throughput occurs.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
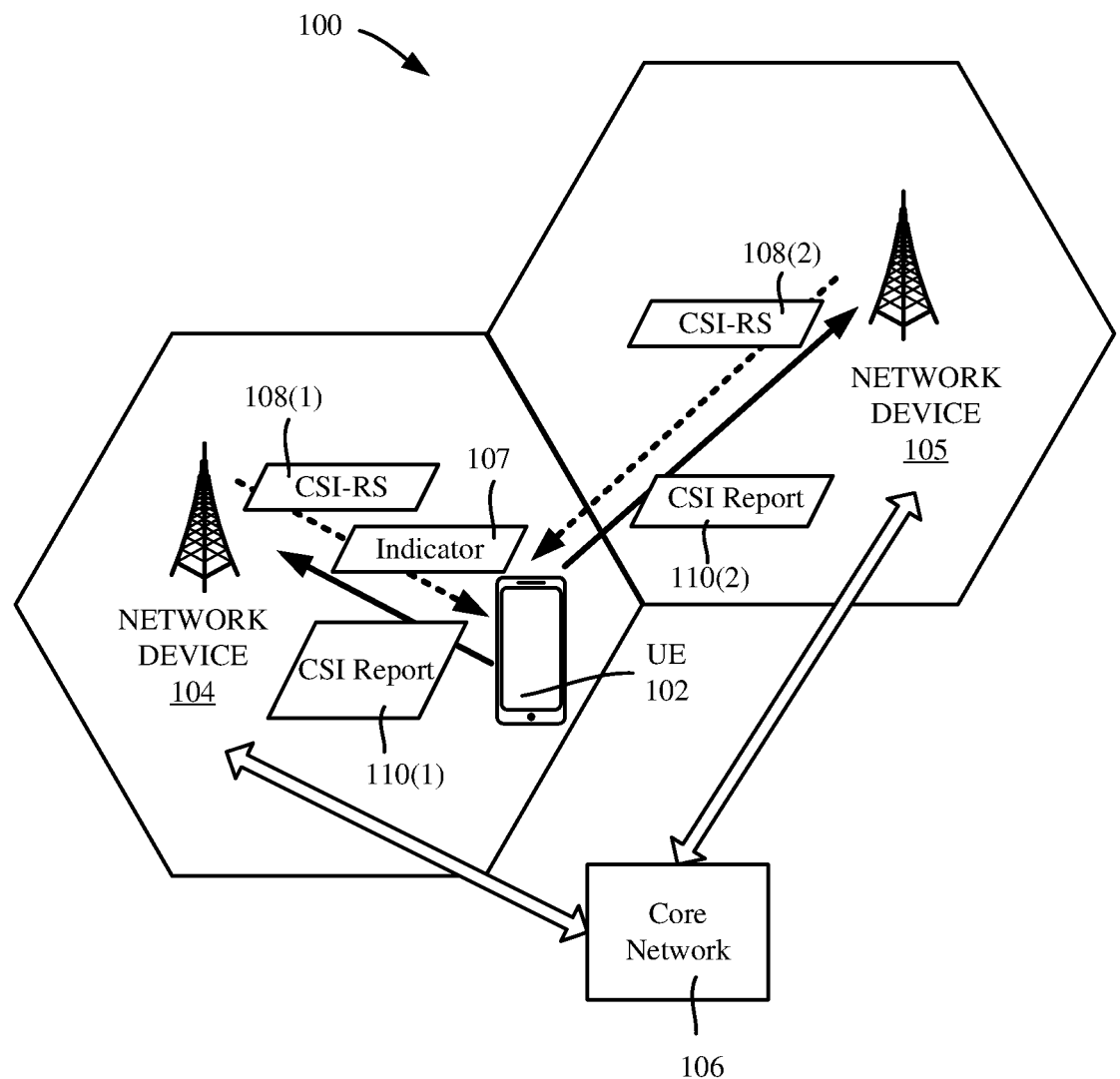
FIG. 1 illustrates an example wireless communication system in which a user equipment communicates with two transmit-receive points, and in which channel state information reference signal (CSI-RS) antenna ports are indicated to the user equipment, including for use in reporting joint channel state information, in accordance with various aspects and implementations of the subject disclosure.

Briefly, one or more aspects of the technology described herein are generally directed towards assigning joint channel state information reference signal (CSI-RS) antenna ports from multiple transmit and receive points (TRPs; sometimes referred to as transmission and reception points or simply transmission points). The network sends indicator data to a wireless device such as a user equipment to indicate which of the ports are assigned. As a result, once assigned CSI-RS antenna ports are known to the user equipment, when the channel state information reference signals are sent, the user equipment can compute joint channel state information (CSI) based on the signals and the indicated CSI-RS ports, and report the joint CSI to the network.

The technology described herein thus helps to avoid the mismatch between the estimated CSI and the scheduled CSI when multiple TRPs are in use. The technology thus facilitates gains in sector throughput and cell edge user throughput, as the network obtains the information about the joint channel quality.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject technology. In various embodiments, the system 100 is or comprises a wireless communication network serviced by one or more wireless communication network providers. In example embodiments, a UE 102 can be communicatively coupled to the wireless communication network via a network device 104 (e.g., network node) and/or a network device 105. The network device(s) can communicate with the user equipment (UE), thus providing connectivity between the UE and the wider cellular network.

In example implementations, the UE 102 is able to send and/or receive communication data via a wireless link to the network devices 104 and 105. The dashed arrow lines from the networks device 104 and 105 to the UE 102 represent downlink (DL) communications and the solid arrow lines from the UE 102 to the network devices 104 and 105 represents uplink (UL) communications.

In the example of FIG. 1, the wireless communication system 100 is depicted with a user equipment (UE) 102 that communicates with multiple (two) transmit-receive point devices, shown as the network device 104 and the network device 105. The network devices 104 and 105 are connected to a core network 106, and can communicate with one another, via ideal backhaul for example. Note that this is only one example implementation, and for example, the technology described herein operates with multiple TRPs that are co-located, e.g., at a single site having multiple antenna panels.

In one or more implementations, as described herein following reference signal-based (CSI-RS) reporting, the user equipment 102 reports the CSI using joint CSI reporting when multiple TRPs are communicating with the user equipment. For example, as shown in FIG. 1, the user equipment receives indicator data 107 from one of the TRPs, e.g., network device 104 (e.g., TRP-A) and as described herein thereby knows which antenna ports of the network device 104 or network devices 104 and 105 are assigned as CSI-RS ports.

As represented in FIG. 1, the network devices 104 and 105 send CSI references signals (CIS-RS) 108(1) and 108(2), respectively, to the user equipment 102. The user equipment 102 can thus compute joint CSI and report the joint CSI to a network device. With ideal backhaul or collocated TRPs, a single report can be sent, e.g., report 110(1) to the network device 104 or report 110(2) to the network device 105; (what this single CSI report comprises (single TRP1, single TRP2, jointly) is governed by the embodiments described herein.) Note however that it is feasible for the UE to send a report to both network devices 104 and 105 (reports 110(1) and 110(2)), respectively.

The system 100 can further include one or more communication service provider networks that facilitate providing wireless communication services to various UEs, including the UE 102 and others (not explicitly shown), via the network devices 104 and/or 105 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network devices 104 and 105 can be connected to the one or more communication service provider networks (e.g., the core network 106) via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UE 102 and the network devices 104 and 105) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use wave-forms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

Note that a DMRS structure for four antenna ports (hence maximum four layers and 4 DMRS) in NR system, for example, has reference symbols within a resource-block transmitted for a single antenna port 0; the same reference symbols are code multiplexed and transmitted on antenna port 1. Similarly for ports 2 and 3 same resource elements are used for transmitting DMRS (demodulation reference symbols), and are code multiplexed as in port 0 and 1. Further note that the resource elements used for rank 3 and rank 4 (ports 2 and 3) are orthogonal in frequency to that of port 0 and 1.

Figure 2:
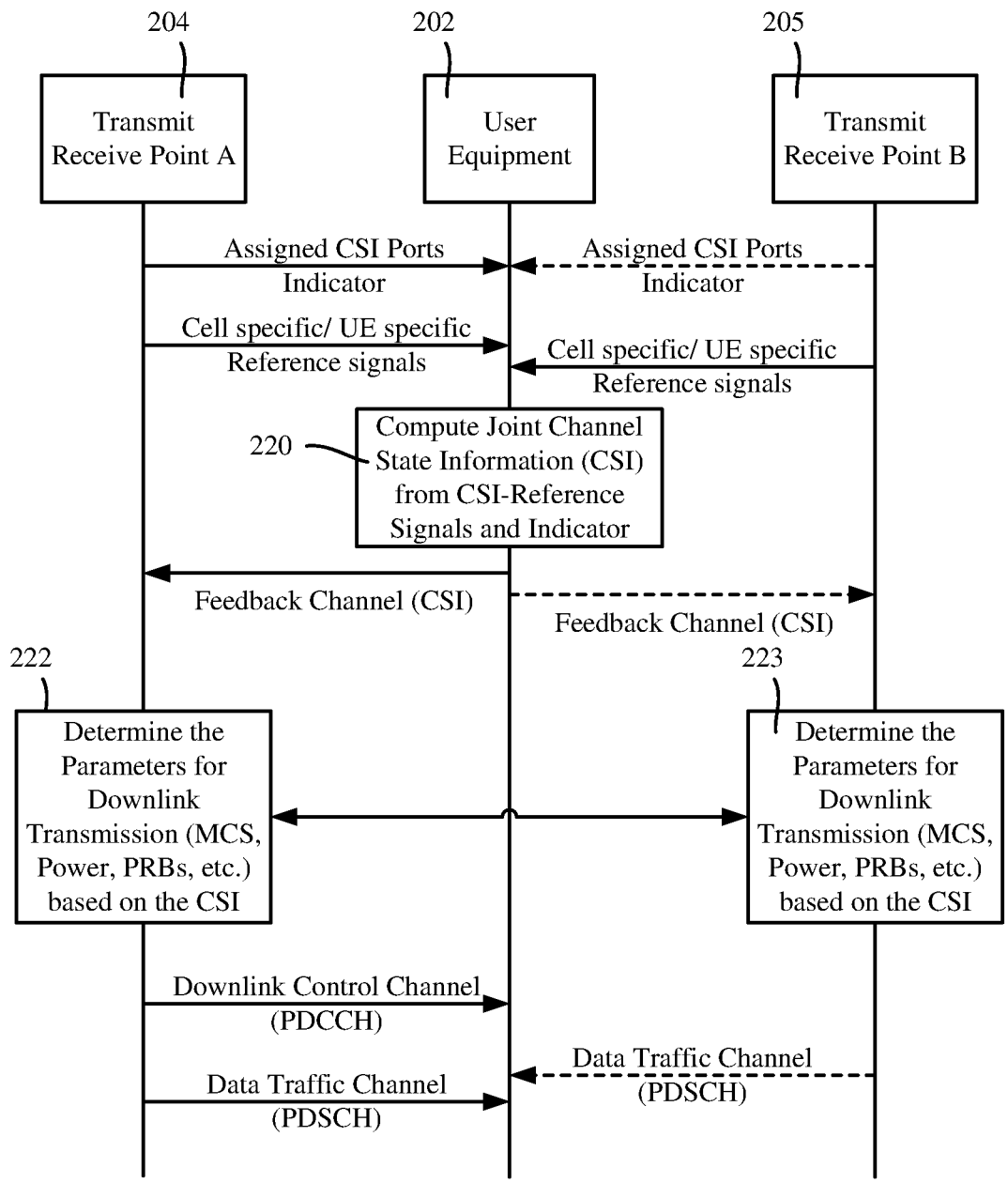
FIG. 2 illustrates an example timing/dataflow message sequence of a user equipment communicating with two transmit-receive points, including to communicate CSI-RS antenna port information, in accordance with various aspects and implementations of the subject disclosure.

FIG. 2 shows a timing/dataflow diagram comprising a message sequence chart for joint CSI computation between a user equipment 202 and two transmit-receive points 204 and 205 (e.g., corresponding to the UE 102 and the network nodes 104 and 105 of FIG. 1, respectively). Note that FIG. 2 describes an example for downlink data transmission in multiple TRP systems, however the same principles are applicable to uplink and sidelink (e.g., vehicle-to-vehicle) systems. Further note that per port CSI-RS transmission is needed from each TRP. As described herein, each TRP indicates the CSI-RS port numbers for computing the CSI, whereby the UE uses these indicated ports, measures the channel from the reference signals and computes the joint CSI, such as wideband rank, PMI, CQI and LI, and passes this information to the TRPs. Hence the network can avoid the mismatch in the CSI with the use of joint CSI.

In the example of FIG. 2, an indicator is sent from the transmit receive point A 204 to the user equipment that indicates which CSI-RS antenna ports (beams) are assigned for transmission of channel state information reference signals to the user equipment 102. The CSI ports indicator can be a PDCCH that triggers a PUSCH for the CSI report. If the TRPs are collocated with multiple panels or the connecting link between the TRP is ideal backhaul, then a single communication can send the indicator data; otherwise each TRP can send the indicator data. In one embodiment, the network can indicate this value using a radio resource control (RRC) configuration message. In another embodiment, the network can send the indicator index using physical layer signaling, such as in downlink control information (DCI).

In one or more implementations, the indicator can be an index or the like to a data structure (e.g., table) that maps the index value to the assigned CSI-RS port or ports, e.g.:

| Value | CSI-RS port(s) |
| --- | --- |
| 0 | 0 |
| 1 | 1 |
| 2 | 2 |
| 3 | 3 |
| 4 | 0, 1 |
| 5 | 0, 2 |
| 6 | 0, 3 |
| 7 | 1, 2 |
| 8 | 1, 3 |
| 9 | 2, 3 |
| 10 | 0, 1, 3 |
| 11 | 0, 1, 2 |
| 12 | 0, 2, 3 |

-continued

| Value | CSI-RS port(s) |
|---|---|
| 13 | 1, 2, 3 |
| 14 | 0, 1, 2, 3 |
| 15 | Reserved | if the total number of CSI-RS ports is equal to 4.

In an alternative implementation, a bitmap can be used to communicate the indicator data, such as with a one bit indicating port in use and a zero bit indicating not in use. For example, if port 2 and port 0 are assigned for CSI-RS, the indicator data in the form of a bitmap for a four port system can be 0101. Such a bitmap can be used for any number of ports, e.g., eight bits for an eight port system.

Continuing with the example of FIG. 2, cell specific/UE specific reference signals are sent from each transmit-receive point device 204 and 205 to the UE 202. As represented via block 220, the UE computes the channel state information (CSI) from the CSI-reference signals, that is, performs CSI-RS-based reporting. Note that any suitable algorithm can be implemented in the receiver to compute the CSI, and can differ among UE vendors.

According to the technology described herein, by indicating to the receiver which ports to take into account when calculating CSI, multiple non-collocated transmission points are supported. This is in contrast to having the receiver treat a plurality of non-collocated transmission points as one single collocated transmission point and the transmission of multiple PDSCH from non-collocated transmission points as one joint transmission.

A CSI report is returned to one of the transmit-receive point devices 204 or 205, as represented via the feedback channel; note that both of the transmit-receive point devices 204 and 205 can receive the report. This allows the transmit-receive points 204 and 205 (which, for example, can communicate via backhaul or by being collocated) to compute the downlink transmission parameters (blocks 222 and 223), including the modulation and coding scheme (MCS), power information, physical resource blocks (PRBs) and so on, based on the CSI-RS-based reporting. The downlink transmission parameters are sent to the user equipment 202 via one of the transmit-receive point devices (the device 204 in FIG. 2) via the corresponding physical downlink control channel (PDCCH).

The downlink control channel (PDCCH) carries information about the scheduling grants. Typically this consist of number of MIMO layers scheduled, transport block sizes, modulation for each codeword, parameters related to HARQ, sub band locations etc. Note that, all DCI formats may not use transmit all the information as shown above. In general, the contents of PDCCH depends on transmission mode and DCI format.

Typically, the following information can be transmitted by means of the downlink control information (DCI) format:
Carrier indicator
Identifier for DCI formats
Bandwidth part indicator
Frequency domain resource assignment
Time domain resource assignment
VRB-to-PRB mapping flag
PRB bundling size indicator
Rate matching indicator
ZP CSI-RS trigger
Modulation and coding scheme for each TB
New data indicator for each TB
Redundancy version for each TB
HARQ process number
Downlink Assignment Index
TPC command for uplink control channel
PUCCH resource indicator
PDSCH-to-HARQ feedback timing indicator
Antenna port(s)
Transmission configuration indication
SRS request
CBG transmission information
CBG flushing out information
DMRS sequence initialization With the computed and received parameters, the user equipment 202 can receive downlink data traffic via the physical downlink shared channels (PDSCH in FIG. 2). The user equipment 202 receives one PDSCH, which is either only from TRP1 or only from TRP2, or is received jointly from both TRPs. The data traffic includes DMRS data, which also can be used to compute joint channel state information, that is, DMRS-based CSI, which can be reported to the transmit and receive point devices 204 and 205 on respective feedback channels, whereby scheduling parameters can be computed for subsequent data traffic transmissions, and so on.

Figure 3:
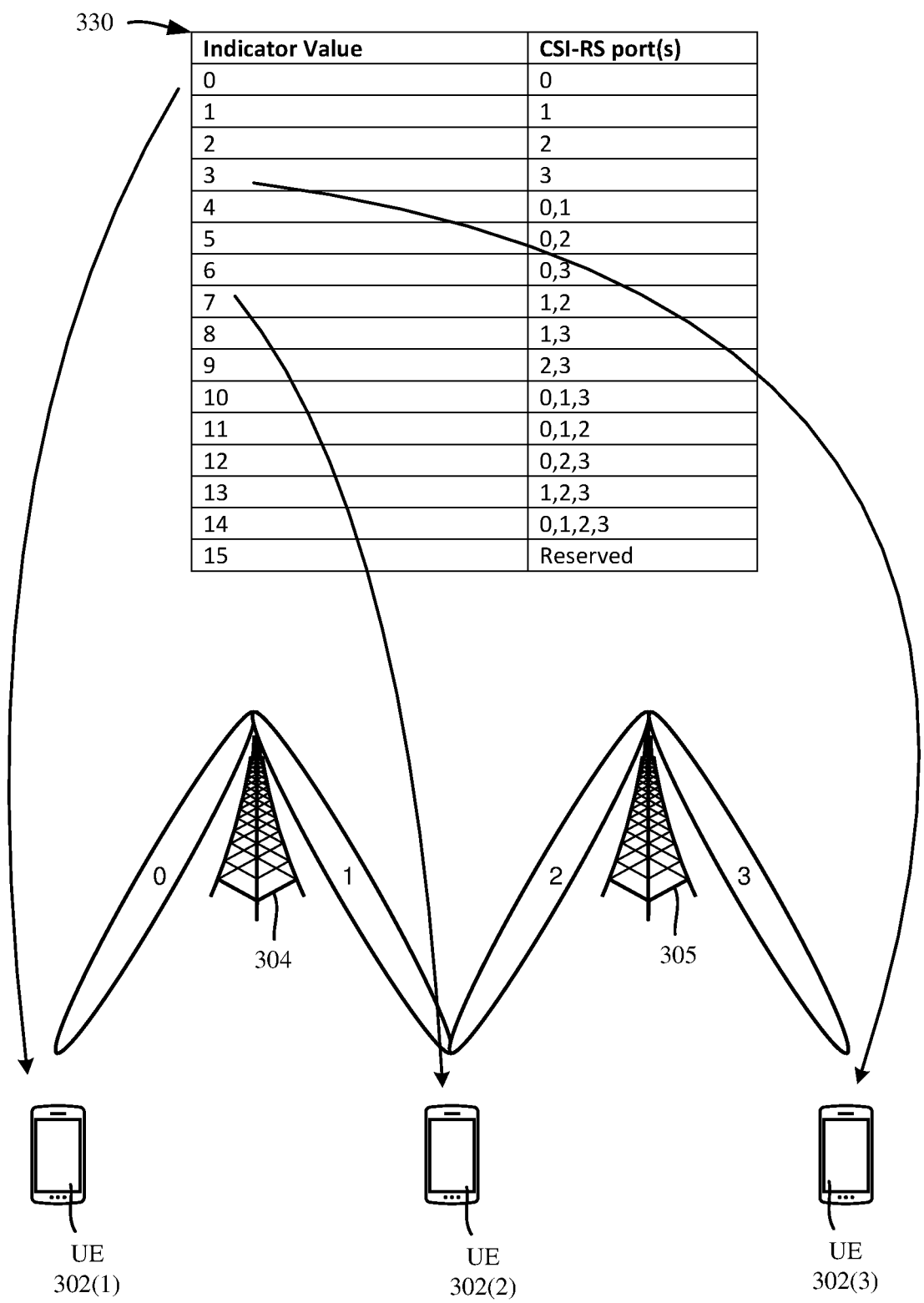
FIGS. 3-5 are representations of example CSI-RS antenna ports and associated beams sent to user equipment(s), in which the network can have multiple transmit-receive points (TRPs) and indicates to the user equipment(s) which antenna ports are assigned as CSI-RS antenna ports, in accordance with various aspects and implementations of the subject disclosure.

FIG. 3 shows an example of how two TRPs can assign different antenna ports (corresponding to beams 0 to 3) to different user equipments 302(1)-302(3), and provide indicator data to the respective user equipments 302(1)-302(3) identifying the respective assigned ports. Note that the network devices/TRPs 304 and 305, and the user equipments 302(1)-302(3) in the example of FIG. 3 each have an instance of a lookup data structure (the table) 330, however only one table 330 is shown in FIG. 3 for purposes of clarity.

In the example of FIG. 3, as represented by the curved arrows, the network device/TRP 304 sends indicator data of value 0 to the user equipment 302(1), and sends an indicator value of 7 to the user equipment 302(2). The network device/TRP 305 sends an indicator value of 3 to the user equipment 302(3). Note that the network device/TRP 305 can send the indicator value of 7 to the user equipment 302(2) instead of (or in addition to) the network device/TRP 304.

As seen via the table 330, the user equipment 302(1) thus knows that the assigned CSI-RS port is port 0 for the user equipment 302(1); the user equipment 302(2) knows that the assigned CSI-RS port are ports 1 and 2 for the user equipment 302(2), and the user equipment 302(3) knows that the assigned CSI-RS port is port 3 for the user equipment 302(3). This knowledge is useable for computing the CSI to report back to the network/TRP.

Figure 4:
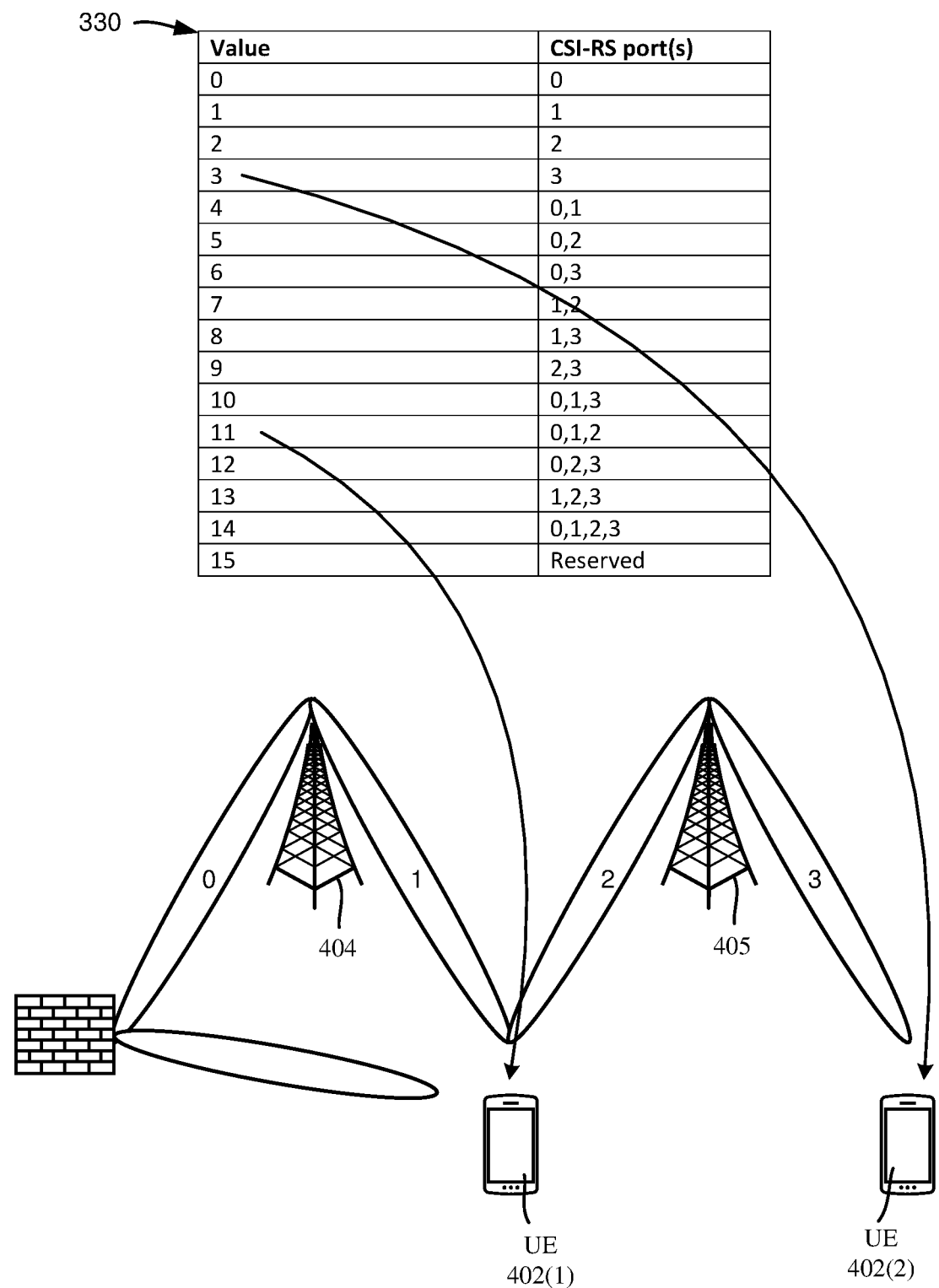

FIG. 4 shows a different scenario, in which two user equipments 402(1) and 402(2) receive indicator data depending on the assigned CSI-RS ports. In this example, the user equipment 402(1) receives indicator value 11, whereby antenna ports 0, 1 and 2 are assigned as CSI-RS ports relevant to the user equipment 402(1). The user equipment 402(2) receives indicator value 3, corresponding to port 3.

Figure 5:
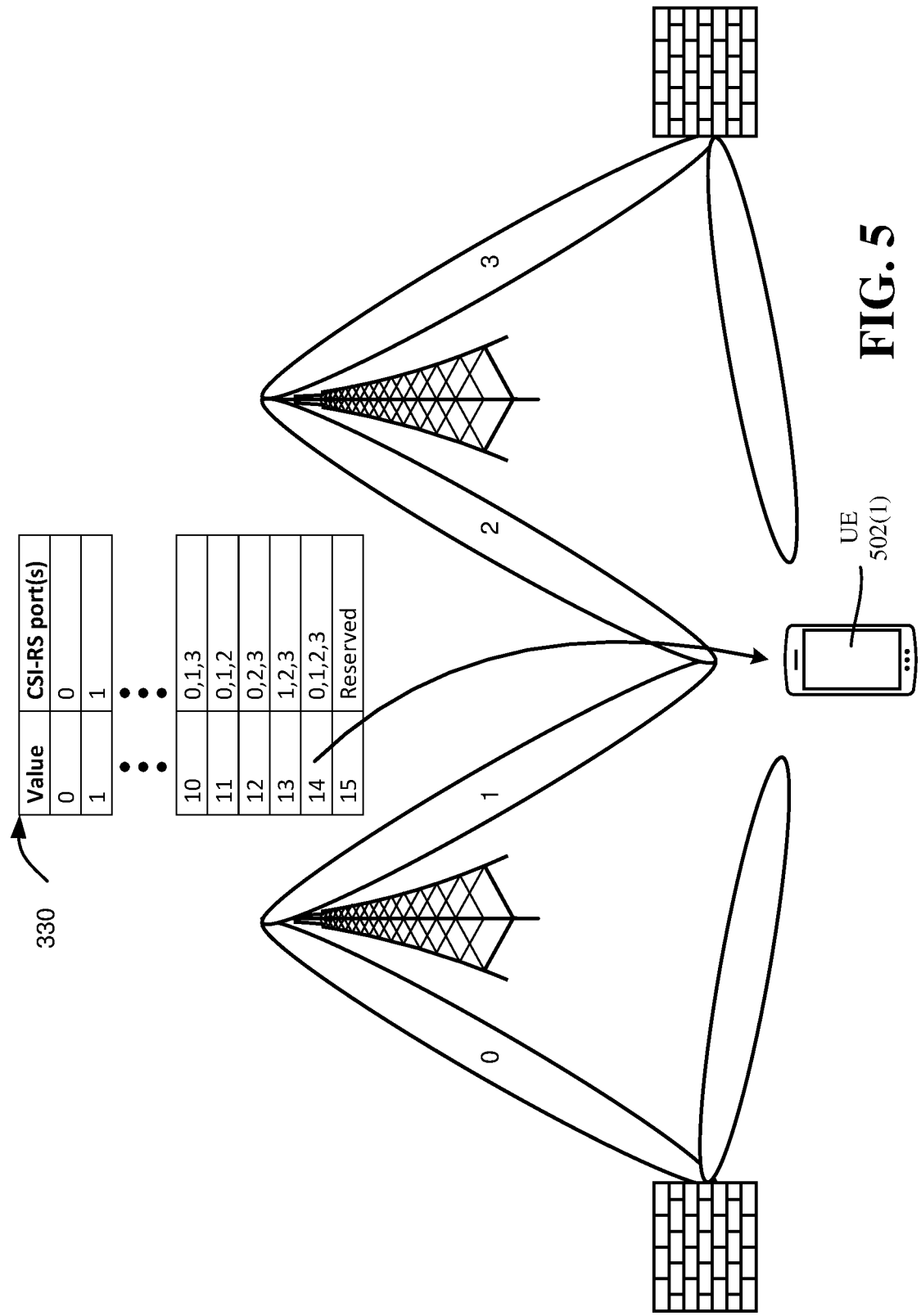

FIG. 5 shows another scenario, in which a user equipment 502(1) is configured with CSI-RS ports 0, 1, 2 and 3. As represented via the curved arrow, the indicator value that is sent and received is 14, which the user equipment 502(1) uses to access the table 330. As a result, the receiver knows to take into account ports 0, 1, 2 and 3 when computing the CSI.

Figure 6:
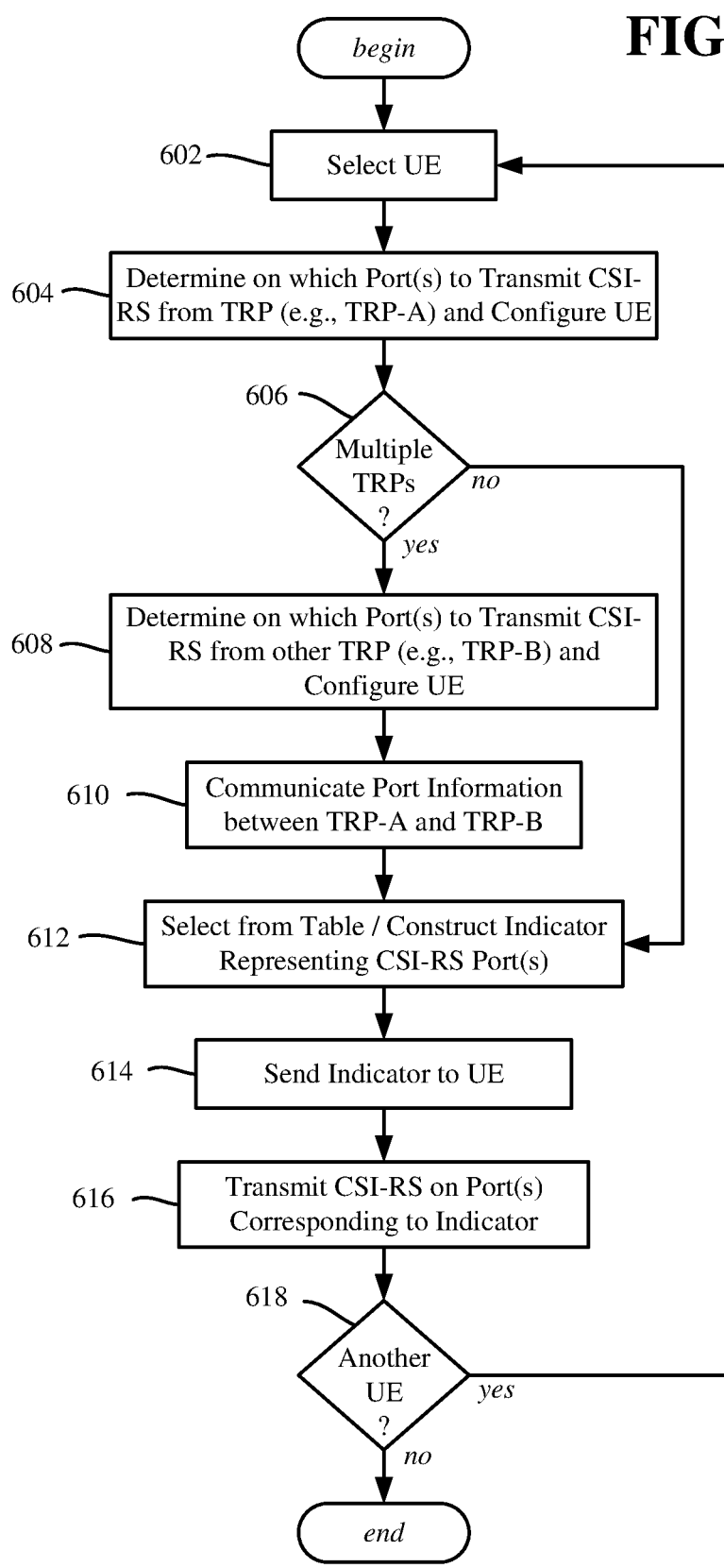
FIG. 6 is a flow diagram of example operations of a transmit and receive point device that indicates to a receiver which antenna ports are assigned as CSI-RS antenna ports, including in a multiple TRP environment, in accordance with various aspects and implementations of the subject disclosure.

FIG. 6 summarizes example operations related to having a TRP (e.g., TRP-A) inform a user equipment as to which antenna port or ports are assigned for CSI-RS transmissions, beginning at operation 602 where a user equipment is selected to receive the relevant indicator data. Operation 604 determines the port or ports for TRP-A and configures the UE accordingly.

Operation 606 represents the TRP determining if another TRP (e.g., TRP-B) is also to be used as a multiple transmission point. If not, then the process branches ahead to operation 612, described below. If TRP-B is a multiple transmission point, then operation 608 represents TRP-B's operation to select and assign CSI-RS port(s) for configuring the user equipment. Operation 610 represents the communication between TRP-A and TRP-B so that the assigned ports are known to TRP-A and TRP-B as needed. If the TRPs are not collocated or ideal backhaul is not available, then TRPA and TRP-B can separately send their relevant indicator data.

Operation 612 selects the index that matches the assigned ports. Alternatively, if a bitmap is used to indicate the antenna ports, the bitmap is constructed at operation 612.

Operation 614 sends the indicator data to the user equipment; this can be via downlink control information in a PDCCH. Thereafter, operation 616 transmits the CSI-RS on the assigned ports.

For example, consider that a first TRP, TRP-A, configures the UE with ports 0 and 1 and a second TRP, TRP-B, configures the UE with ports 2 and 3. That is, a CSI-RS per each port is indicated for every TRP. With the indication (e.g., an index of 14 from the table, or a 1111 from a bitmap), the UE can compute the joint CSI based on the received CSI-RS and the indicated CSI-RS ports.

If appropriate, operation 618 repeats the process for a next user equipment, and so on.

Figure 7:
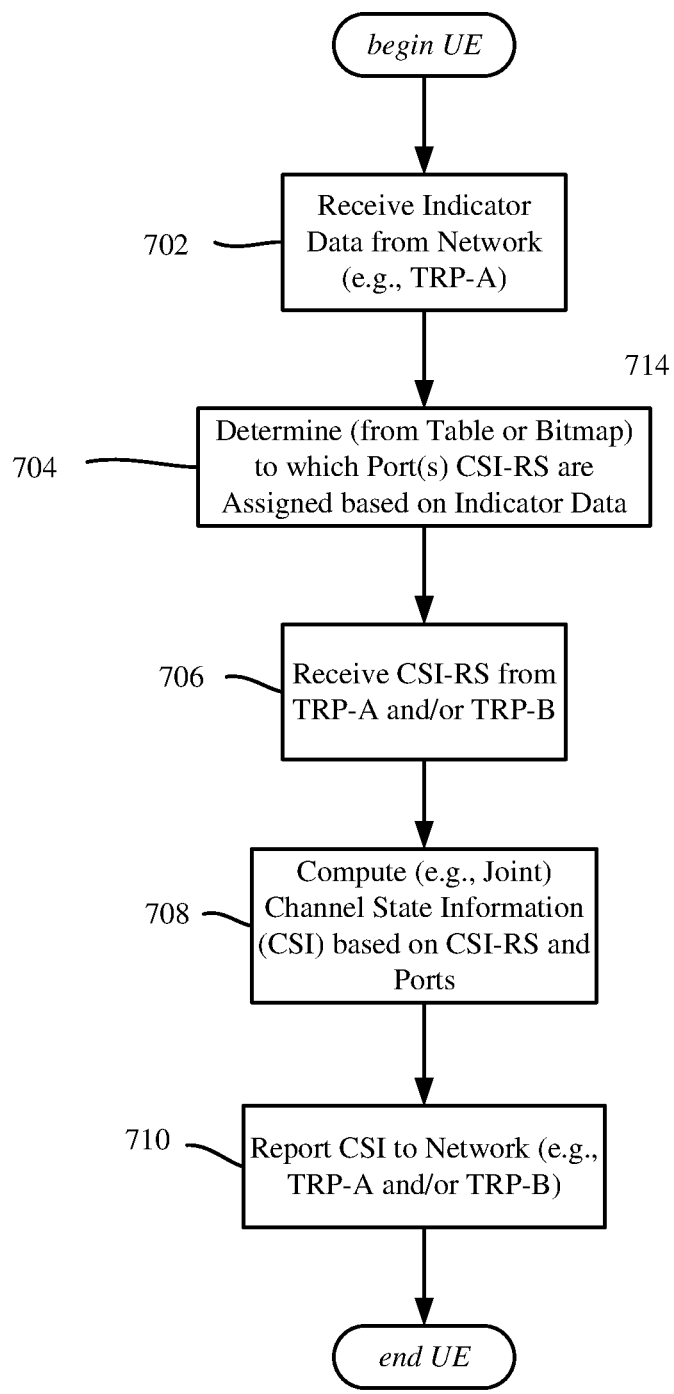
FIG. 7 illustrates a flow diagram of example operations of a user equipment that receives indicator data as to which antenna ports are assigned as CSI-RS antenna ports, in accordance with various aspects and implementations of the subject disclosure.

FIG. 7 represents example operations of a receiver such as a user equipment, beginning at operation 702 where the indicator data is received from the network. Operation 704 represents determining (from the table or a bitmap) the CSI-RS ports based on the indicator data. Note that in one implementation, the UE only knows which ports are assigned, not how these map to physical TRPs; (antenna ports are a logical construct, and thus, for example, a UE may know CSI-RS transmission is on antenna ports 0 and 3, but not that these map to TRP1 and TRP2.

When the reference signals are received (operation 706), operation 708 computes the channel state information (CSI) based on the signals and the port information. Operation 710 reports the CSI to the network, which can be to one or both TRPs depending on the ports on which the CSI-RS were sent.

Figure 8:
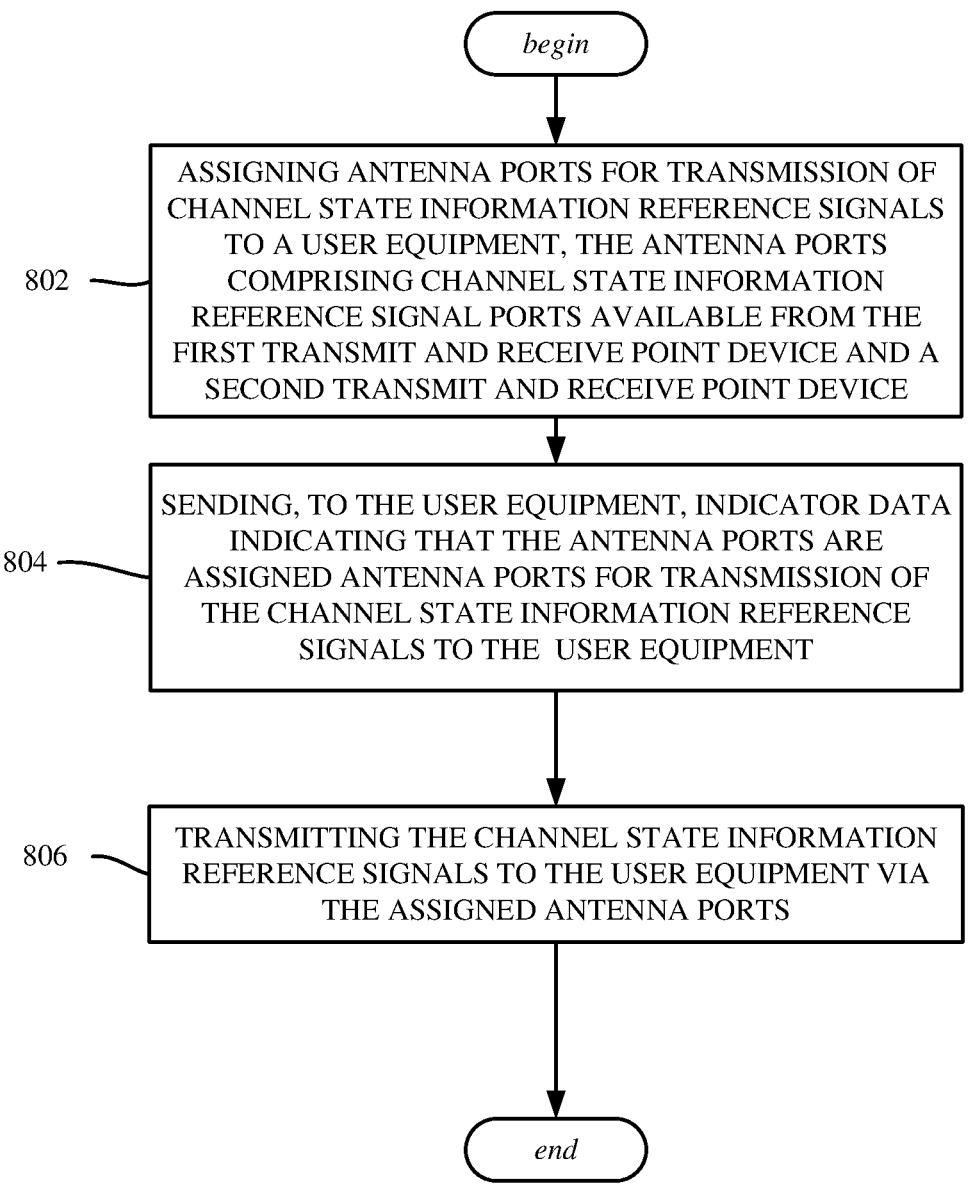
FIG. 8 illustrates a flow diagram of example operations of a transmit and receive point device that sends indicator data that indicates which antenna ports are assigned as CSI-RS antenna ports, in accordance with various aspects and implementations of the subject disclosure.

FIG. 8 summarizes various example operations, such as of a first transmit and receive point device of a wireless network, e.g., comprising a processor and a memory that stores executable instructions that, when executed by the processor, facilitate performance of operations. Operation 802 represents assigning antenna ports for transmission of channel state information reference signals to a user equipment, the antenna ports comprising channel state information reference signal ports available from the first transmit and receive point device and a second transmit and receive point device. Operation 804 represents sending, to the user equipment, indicator data indicating that the antenna ports are assigned antenna ports for transmission of the channel state information reference signals to the user equipment. Operation 806 represents transmitting the channel state information reference signals to the user equipment via the assigned antenna ports.

Assigning the one or more antenna ports can comprise configuring the user equipment with a first antenna port of the first transmit and receive point device and a second antenna port of the second transmit and receive point device. Further operations can comprise communicating with the second transmit and receive point device to determine the indicator data to send to the user equipment. Further operations can comprise receiving joint channel state information from the user equipment based on the channel state information reference signals transmitted via the assigned antenna ports.

Sending the indicator data to the user equipment can comprise sending the indicator data in a radio resource control configuration message. Sending the indicator data to the user equipment can comprise sending the indicator data using physical layer signaling. Sending the indicator data to the user equipment can comprise sending the indicator data in downlink control information.

Sending the indicator data to the user equipment can comprise sending an index value to a data structure that maps the index value to a group of the channel state information reference signal ports. Sending the indicator data to the user equipment comprises sending bitmap data to the user equipment, the bitmap data comprising respective bit values that indicate whether respective ports are assigned for transmission of respective channel state information reference signals.

Figure 9:
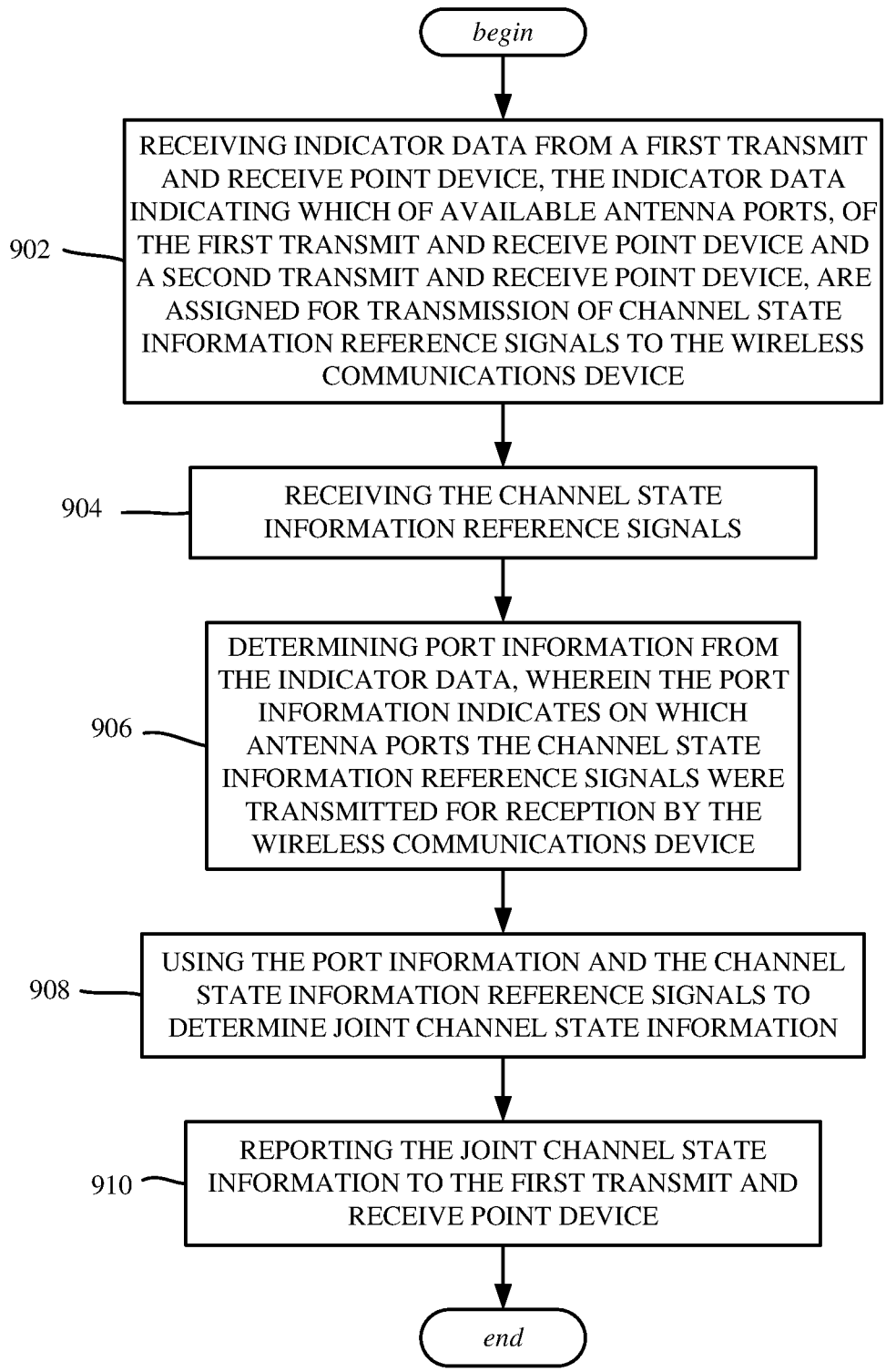
FIG. 9 illustrates a flow diagram of example operations of a wireless communications device (such as a user equipment) that receives indicator data that indicates which antenna ports are assigned as CSI-RS antenna ports, in accordance with various aspects and implementations of the subject disclosure.

FIG. 9 summarizes various example operations, such as of a wireless communications device of a wireless network, e.g., comprising a processor and a memory that stores executable instructions that, when executed by the processor, facilitate performance of operations. Operation 902 represents receiving indicator data from a first transmit and receive point device, the indicator data indicating which of available antenna ports, of the first transmit and receive point device and a second transmit and receive point device, are assigned for transmission of channel state information reference signals to the wireless communications device. Operation 904 represents receiving the channel state information reference signals. Operation 906 represents determining port information from the indicator data, wherein the port information indicates on which ports the channel state information reference signals were transmitted for reception by the wireless communications device. Operation 908 represents using the port information and the channel state information reference signals to determine joint channel state information. Operation 910 represents reporting the joint channel state information to the first transmit and receive point device.

Receiving the indicator data can comprise receiving a radio resource control configuration message. Receiving the indicator data can comprise receiving downlink control information. Determining the port information can comprise accessing a data structure that associates the indicator data with port identifiers.

Figure 10:
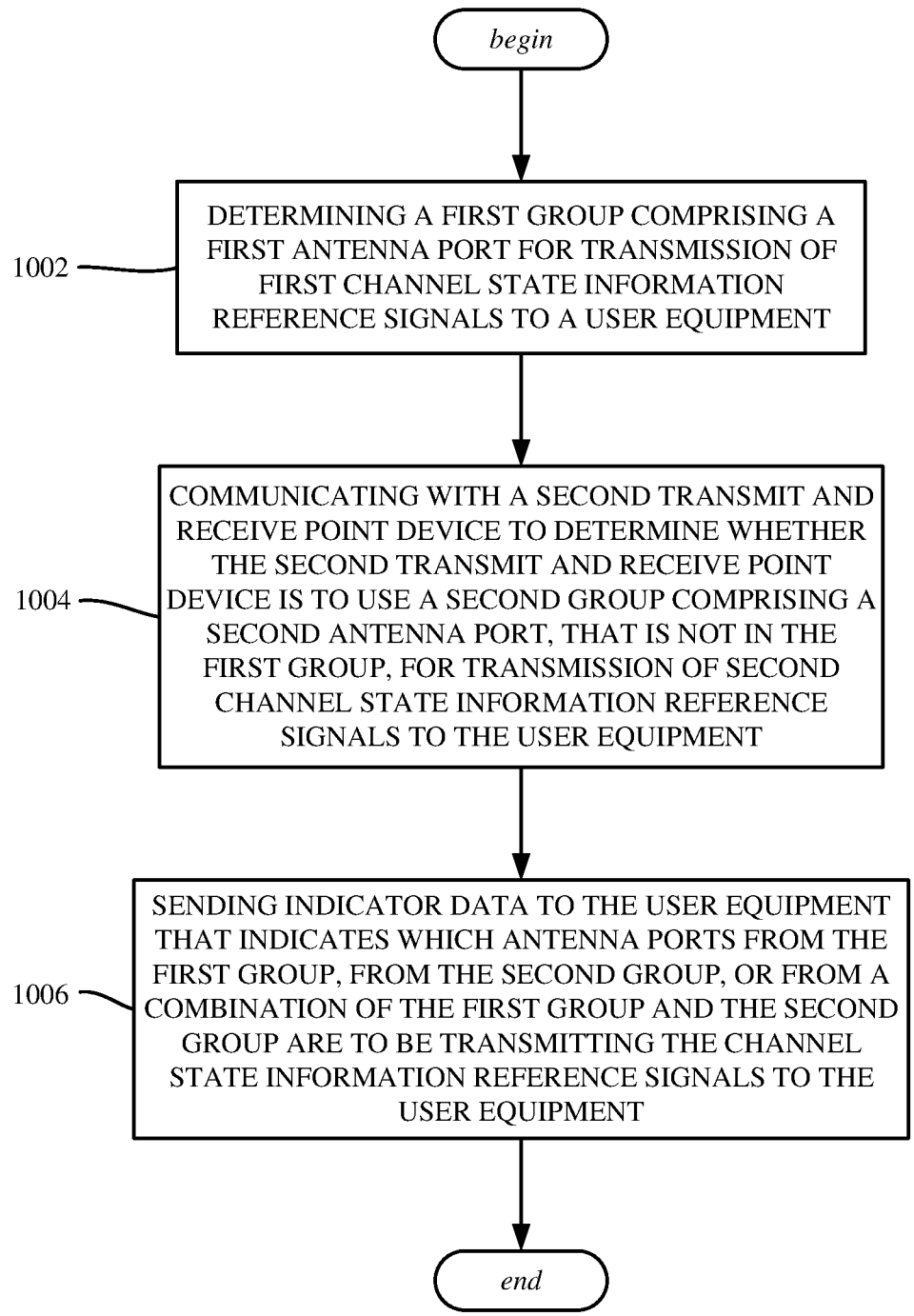
FIG. 10 illustrates a flow diagram of example operations of a transmit and receive point device that sends indicator data that indicates which antenna ports are assigned as CSI-RS antenna ports in a multiple TRP environment, in accordance with various aspects and implementations of the subject disclosure.

Other example operations are represented in FIG. 10, and which, for example, can be implemented via a machine-readable storage medium, comprising executable instructions that, when executed by a processor of a first transmit and receive point device of a wireless network, facilitate performance of the operations. Operation 1002 represents determining a first group comprising a first antenna port for transmission of first channel state information reference signals to a user equipment. Operation 1004 represents communicating with a second transmit and receive point device to determine whether the second transmit and receive point device is to use a second group comprising a second antenna port, that is not in the first group, for transmission of second channel state information reference signals to the user equipment. Operation 1006 represents sending indicator data to the user equipment that indicates which antenna ports from the first group, from the second group, or from a combination of the first group and the second group are to be transmitting the channel state information reference signals to the user equipment.

Sending the indicator data comprises sending the indicator data in a radio resource control configuration message to the user equipment. Sending the indicator data can comprise sending the indicator data to the user equipment using physical layer signaling.

Sending the indicator data can comprise sending a bitmap with respective bits in the bitmap representing respective ports and comprising respective bit values indicating whether a respective port is to be used or is not to be used for transmission of the channel state information reference signals to the user equipment. Sending the indicator data can comprise sending an index value to a data structure that maps respective index values to respective one or more antenna port identifiers.

Further operations can comprise sending channel state information reference signals to the user equipment on the port or ports corresponding to the indicator data.

The channel state information reference signals can be sent from the first transmit and receive point device and the second transmit and receive point device, and further operations can comprise receiving joint channel state information based on the channel state information reference signals.

As can be seen, the technology described herein facilitates a user equipment to report joint CSI based on the antenna ports used to transmit the CSI reference signals. The network can indicate the ports to the user equipment. This avoids mismatch in CSI reporting with multiple transmit and receive points, and thereby provides gains in data throughput.

Figure 11:
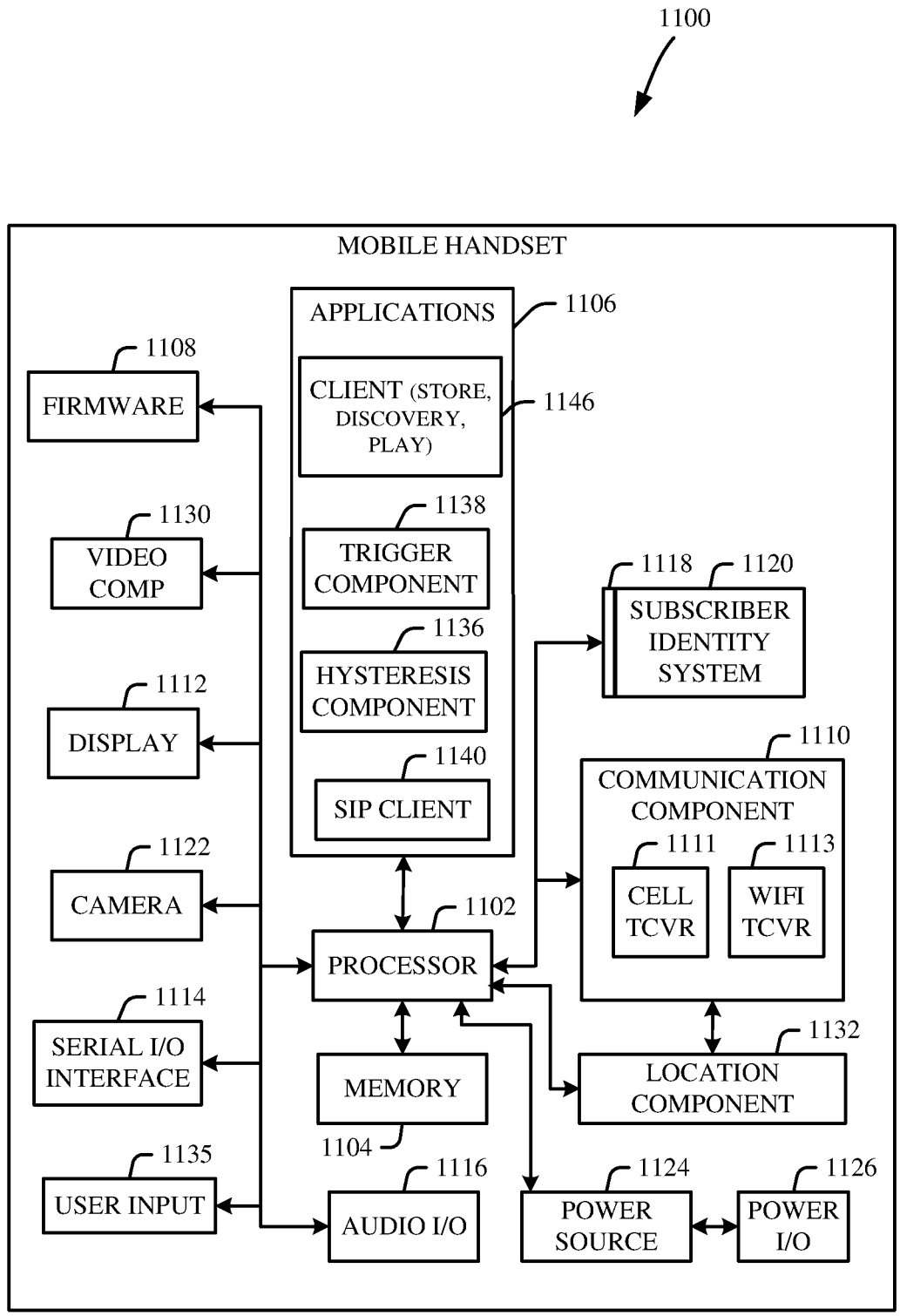
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
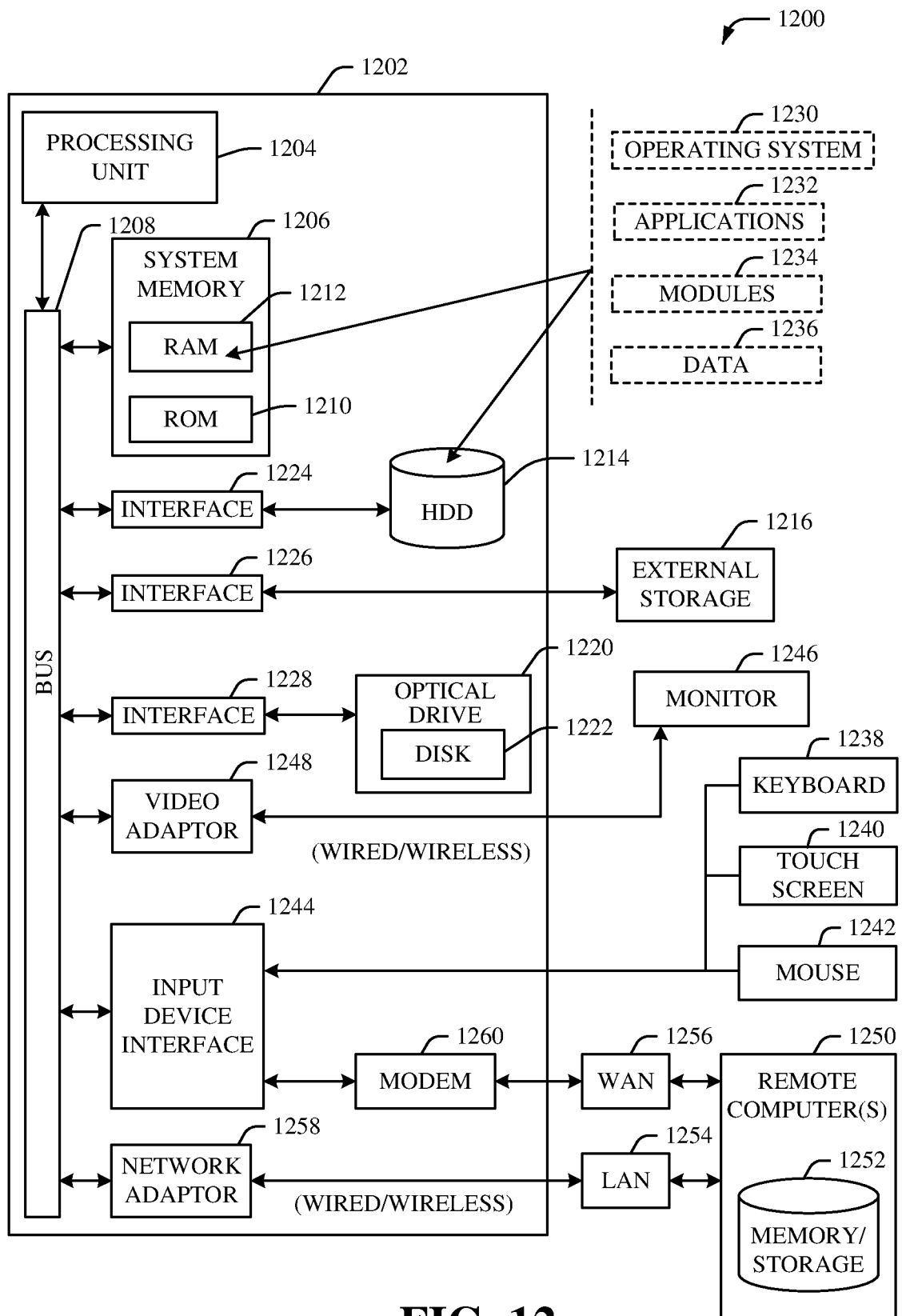
FIG. 12 illustrates an example block diagram of an example computer operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the technology described herein can be practiced with other computer system configurations, including single-processor or multi-processor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10 BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    determining, by first network equipment comprising a processor, a first antenna port of the first network equipment for transmission of first channel state information reference signals to a user equipment, and a second antenna port of second network equipment for transmission second channel state information reference signals to the user equipment; and
    facilitating, by the first network equipment, transmitting, to the user equipment, a combined indication specifying that a combination of the first antenna port of the first network equipment and the second antenna port of the second network equipment will be transmitting the first channel state information reference signals and the second channel state information reference signals to the user equipment.

2. The method of claim 1, further comprising facilitating, by the first network equipment, transmitting the first channel state information reference signals to the user equipment via the first antenna port.

3. The method of claim 2, further comprising facilitating, by the first network equipment, receiving joint channel state information responsive to transmitting the first channel state information reference signals.

4. The method of claim 1, wherein transmitting the combined indication comprises transmitting the combined indication via a radio resource control configuration message.

5. The method of claim 1, wherein transmitting the combined indication comprises transmitting the combined indication using physical layer signaling.

6. The method of claim 1, wherein transmitting the combined indication comprises transmitting the combined indication in downlink control information.

7. The method of claim 1, wherein transmitting the combined indication comprises transmitting an index value for a data structure that maps index values to antenna port identifiers.

8. A first base station, comprising:
    a processor; and
    a memory that stores executable instructions that, when executed by the processor, facilitate performance of operations, comprising:
        determining a first antenna port of the first base station for transmission of first channel state information reference signals to a user equipment, and a second antenna port of a second base station for transmission second channel state information reference signals to the user equipment, and
        sending, to the user equipment, a joint indication specifying that a combination of the first antenna port of the first base station and the second antenna port of the second base station is going to be transmitting the first channel state information reference signals and the second channel state information reference signals to the user equipment.

9. The first base station of claim 8, wherein the operations further comprise sending the first channel state information reference signals to the user equipment via the first antenna port.

10. The first base station of claim 9, wherein the operations further comprise receiving joint channel state information responsive to sending the first channel state information reference signals.

11. The first base station of claim 8, wherein sending the joint indication comprises sending the joint indication via a radio resource control configuration message.

12. The first base station of claim 8, wherein sending the joint indication comprises sending the joint indication using physical layer signaling.

13. The first base station of claim 8, wherein sending the joint indication comprises sending the joint indication in downlink control information.

14. The first base station of claim 8, wherein sending the joint indication comprises sending at least one index value for a data structure that maps index values to antenna port identifiers.

15. A non-transitory machine-readable medium, comprising executable instructions that, when executed by a processor of a first access point, facilitate performance of operations, comprising:
    determining a first antenna port of the first access point for transmission of first channel state information reference signals to a mobile device, and a second antenna port of a second access point for transmission second channel state information reference signals to the mobile device, and
    communicating, to the mobile device, a combined indication specifying that the first antenna port of the first access point is designated to transmit the first channel state information reference signals to the mobile device and the second antenna port of the second access point is designated to transmit the second channel state information reference signals to the mobile device.

16. The non-transitory machine-readable medium of claim 15, wherein the operations further comprise communicating the first channel state information reference signals to the mobile device via the first antenna port.

17. The non-transitory machine-readable medium of claim 16, wherein the operations further comprise receiving joint channel state information responsive to communicating the first channel state information reference signals.

18. The non-transitory machine-readable medium of claim 15, wherein communicating the combined indication comprises communicating the combined indication via a radio resource control configuration message.

19. The non-transitory machine-readable medium of claim 15, wherein communicating the combined indication comprises communicating the combined indication using physical layer signaling.

20. The non-transitory machine-readable medium of claim 15, wherein communicating the combined indication comprises communicating the combined indication in downlink control information.

* * * * *